United States Patent
Saito

(10) Patent No.: US 6,961,706 B2
(45) Date of Patent: Nov. 1, 2005

(54) SPEECH RECOGNITION METHOD AND APPARATUS

(75) Inventor: Hiroshi Saito, Saitama (JP)

(73) Assignee: Pioneer Corporation, Tokyo (JP)

(*) Notice: Subject to any disclaimer, the term of this patent is extended or adjusted under 35 U.S.C. 154(b) by 739 days.

(21) Appl. No.: 09/973,774

(22) Filed: Oct. 11, 2001

(65) Prior Publication Data

US 2002/0046028 A1 Apr. 18, 2002

(30) Foreign Application Priority Data

Oct. 12, 2000 (JP) .................................... P2000-312476

(51) Int. Cl.⁷ ............................................ G10L 15/00
(52) U.S. Cl. ..................................... 704/275; 704/251
(58) Field of Search ............................... 704/251, 270, 704/275

(56) References Cited

U.S. PATENT DOCUMENTS

| | | | | |
|---|---|---|---|---|
| 4,742,481 A | * | 5/1988 | Yoshimura | 704/10 |
| 5,535,120 A | * | 7/1996 | Chong et al. | 704/3 |
| 5,835,893 A | * | 11/1998 | Ushioda | 704/257 |
| 5,905,773 A | * | 5/1999 | Wong | 379/88.03 |
| 6,112,174 A | | 8/2000 | Wakisaka et al. | 704/257 |
| 6,282,508 B1 | * | 8/2001 | Kimura et al. | 704/10 |

FOREIGN PATENT DOCUMENTS

| | | |
|---|---|---|
| EP | 0 903 728 | 3/1999 |
| EP | 0 935 123 | 8/1999 |
| JP | 2000-089782 | 3/2000 |
| JP | 2000-137729 | 5/2000 |

* cited by examiner

Primary Examiner—Daniel Abebe
(74) Attorney, Agent, or Firm—Morgan Lewis & Bockius LLP

(57) ABSTRACT

Concerned is speech recognition that reference speech information is extracted from a plurality of speech recognition dictionaries in a hierarchical structure to compare between extracted reference speech information and an inputted speech thereby recognizing the speech. Reference speech information representative of hierarchical-level skipping is prepared in a predetermined speech recognition dictionary so that, when recognizing an input corresponding to the reference speech information representative of hierarchical-level skipping, speech recognition is carried out by extracting a part of speech recognition dictionary belonging to a lower hierarchical level of the reference speech information being compared.

12 Claims, 8 Drawing Sheets

SPEECH RECOGNITION METHOD AND APPARATUS

BACKGROUND OF THE INVENTION

1. Field of the Invention

This invention relates to a speech recognition apparatus and speech recognition method for recognizing the speech inputted by a user to control an apparatus, and more particularly to an improvement in speech input operation.

2. Description of the Related Art

As car navigation for designating a desired location to set a destination and search a route from a current position of a vehicle to the destination and displaying it together with a map including the current position on the display thereby provide a guide to the destination, there is recent advent of those having speech-operated functions adapted to recognize the input speeches of the user by use of a mike thus enabling various operations through recognized speeches.

The location designation in car navigation with speech operation is performed by sequentially speaking and inputting speeches in kind of the facilities existing in a subject of location such as schools, hospitals and stations or location addresses, in response to a guidance message and finally speaking a location native name. In this manner, recognition rate is secured by setting subject-of-recognition words/phrases in each speech and the subsequent narrowing down of the subject-of-recognition words/phrases.

One example of a setting procedure of a designation will be explained. In the initial stage, the speech recognition system side is set with a "Control Command Dictionary" as a control-command subject-of-recognition words/phrases for car-navigating operation. By user's speaking of a command "Set Designation", an intention of setting a route to the destination is conveyed to the system.

Subsequently, there is a need to designate a concrete location of a destination. However, because the locations prepared on the car navigation is huge, designation with a once speech operation is not practical from a viewpoint of limitation in recognition rate or memory size. Accordingly, narrowing down is made for the number of locations to be designated.

First, narrowing down is made in the kind of facilities existing in the subject of location (hereinafter referred to as genre). The speech recognition dictionary is replaced from a "Control Command Dictionary" to a "Genre Name Dictionary", wherein (1) a guidance message "Genre Name Please" is outputted to prompt the user to speak a genre. In response to this, if the user (2) speaks, for example, "Educational Facility" as a genre, the speech recognition system recognizes the speech. In order to designate a further detailed sub-genre belonging to the educational facilities for further narrowing down, the speech recognition dictionary is replaced from the "Genre Name Dictionary" to a "Sub-genre Name Dictionary Belonging to Education Facility" and (3) a guidance message "Next Genre Name Please" is outputted to prompt the user to speak a sub-genre name. In response to this, if the user (4) speaks, for example, "University and College" as a sub-genre, the speech recognition system recognizes the speech.

If the sub-genre is established, narrowing down is further made in region. The speech recognition dictionary is replaced from the "Sub-genre Name Dictionary" to a "Metropolis-and-District Name Dictionary" and (5) a guidance message "Metropolis or District Name Please" to prompt the user to speak a metropolis-or-district name. In response to this, if the user (6) speaks, for example, "Tokyo Metropolis", the speech recognition system recognizes the speech as "Tokyo Metropolis". In the case that the sub-genre is "University and College" and the metropolis-or-district name is "Tokyo Metropolis", the system side is previously determined to execute a further detailed designation of a city/ward/town/village name. For this reason, the speech recognition dictionary is replaced from the "Metropolis-and-District Name Dictionary" to a "Tokyo-Metropolis City/Ward/Town/Village Name Dictionary" and (7) a guidance message "City/Ward/Town/Village Name Please" is outputted to prompt the user to speak a city/ward/town/village name. In response to this, if the user (8) speaks, for example, "Shinjyuku Ward", the speech recognition system recognizes the speech.

The system side replaces the speech recognition dictionary from the "Tokyo-Metropolis City/Ward/Town/Village Name" to a "University-and-College Name Dictionary" having facility names as subjects of recognition belonging to the university and college existing in Shinjyuku ward, Tokyo and (9) a guidance message "Name Please" is outputted to prompt the user to speak a concrete name of the designated location. Herein, if the user speaks "OO University (or College)", the speech recognition system recognizes it and the navigator sets the OO University (or College) as a destination. In this manner, the subject-of-location conditions are inputted to reduce the number of subjects of location thereby inputting the native names of the narrowed subjects of location.

In the meanwhile, because the foregoing narrowing conditions and condition-inputting order are previously fixed, there occurs a situation that a condition not known by the user be prompted to input. On that occasion, the user if cannot respond to the prompt is not allowed to proceed to the subsequently continuing steps for inputting narrowing conditions. Consequently, the designation of location must be given up without speaking a concrete name of an objective subject of location. Thus, there has been difficulty in operationality and responsibility.

SUMMARY OF THE INVENTION

It is an object of the present invention to provide a speech recognition apparatus and speech recognition method improved in operationality and responsibility by architecting a structure that a condition input requested from the system is skipped over to prepare "Unknown", "Pass" or the like as the reference speech information for proceeding to the subsequent condition input (hereinafter referred to as hierarchical-level skipping word/phrase) so that, receiving an input of a hierarchical-level skipping word/phrase by a user, proceeding is allowed to the subsequent continuing steps for designating a location.

To achieve the above object, according to the present invention, there is provided a speech recognition apparatus comprising a hierarchical dictionary section stored with a plurality of speech recognition dictionaries having a plurality of reference speech signals with mutual association in a hierarchical fashion, extracting means for extracting a proper speech recognition dictionary from the hierarchical dictionary section, list storing means for storing the extracted speech recognition dictionary, speech input means for inputting a speech, recognizing means for comparing an input speech with the reference speech information in the speech recognition dictionary stored in the list storing means to thereby recognize the speech, wherein the extracting means extracts a speech recognition dictionary belonging to a lower hierarchical level of the reference speech information corresponding to the speech recognized and the list storing means updates and stores the extracted speech recognition dictionary, the speech recognition apparatus characterized in that: reference speech information representative of hierarchical-level skipping is prepared in a predetermined speech recognition dictionary so that, when the recognizing means recognizes a speech input corresponding to the reference speech information representative of hierarchical-level skipping, the extracting means extracts, and updates and stores to the list storing means, a speech recognition dictionary belonging to a lower hierarchical level of the reference speech information stored in the list storing means.

Preferably, the speech recognition apparatus comprises as the speech recognition dictionary a kind-based dictionary storing kinds of facilities and a location dictionary storing facility names belonging to the kinds of the facilities.

More preferably, the speech recognition apparatus comprises as the speech recognition dictionary a region dictionary storing region names and a location dictionary storing facility names of facilities existing in any of the regions.

Further preferably, the speech recognition apparatus comprises as the speech recognition dictionary a region dictionary storing region names, a kind-based dictionary storing kind names of the facilities and a location dictionary storing facility names of facilities existing in any of the regions and belonging to any of the kinds, wherein, after the reference speech information representative of hierarchical-level skipping is recognized in the kind-based name selecting level, the extracting means extracts the region dictionary.

According to the invention, there is also provided a speech recognition apparatus comprising number determining means for determining the number of pieces of reference speech information in the speech recognition dictionary belonging to a lower hierarchical level of the reference speech information recognized by the recognizing means, input-speech storing means for storing a speech inputted, and similar-word storing means for recognizing similar reference speech information by sequentially comparing by the recognizing means between a speech stored in the input-speech storing means and reference speech information stored in the list storing means to store the similar reference speech information, the speech recognition apparatus wherein determining means is provided in the number determining means to determine whether the number of words/phrases of the reference speech information in the speech recognition dictionary belonging to the lower hierarchical level of the reference speech information corresponding to a speech recognized exceeds a reference value or not; when determined as the predetermined number or greater, the extracting means extracting, and storing to the list storing means, a speech recognition dictionary as a part of the speech recognition dictionary belonging to the lower hierarchical level; after the recognizing means completes comparison with the reference speech information stored in the list storing means, the extracting means extracting an unextracted dictionary of among the speech recognition dictionaries belonging to the lower hierarchical level to be updated and stored by the list storing means; the recognizing means sequentially comparing between reference speech information belonging to a dictionary updated and stored in the list storing means and the speech stored in the input-speech storing means to recognize similar reference speech information; and the similar-word storing means additionally storing the similar reference speech information newly recognized.

Preferably, the recognizing means recognizes, and renders as a recognition result, one of all similar words stored in the similar-word storing means.

More preferably, a plurality of pieces of similar reference speech information of among the reference speech information stored in the list storing means are stored in the similar-word storing means, comprising selecting means for selecting further a recognition result from among all pieces of similar reference speech information stored in the similar-word storing means.

According to the invention, there is also provided a speech recognition apparatus comprising a hierarchical dictionary section stored with a plurality of speech recognition dictionaries having a plurality of pieces of reference speech information, extracting means for extracting one dictionary of among the plurality of speech recognition dictionaries, list storing means for storing the dictionary extracted, speech input means for inputting a speech, an input-speech storing means for storing an input speech, recognizing means for sequentially comparing between a speech stored in the input-speech storing means and the reference speech information stored in the list storing means to recognize similar reference speech information, and similar-word storing means for storing the similar pieces of the reference speech information, the speech recognition apparatus characterized in that: after the recognizing means completes a comparison between all pieces of the reference speech information belonging to the dictionaries stored in the list storing means and a speech stored in the input-speech storing means, the extracting means extracts from the speech recognition dictionary an unextracted dictionary to be updated and stored by the list storing means; the recognizing means comparing between reference speech information belonging to a dictionary updated and stored to the list storing means and the speech stored in the input-speech storing means to recognize similar reference speech information; and the similar-word storing means additionally storing the similar reference speech information newly recognized.

Preferably, the speech recognition apparatus comprises selecting means for selecting further a recognition result from among a plurality of pieces of reference speech information stored in the similar-word storing means.

With the foregoing structure, where the user is requested to input an unknown condition during narrowing down for a designation location, search can be continued by inputting the reference speech information representative of hierarchical-level skipping (speaking "unknown") thereby improving operationality and responsibility. Incidentally, in this case, because the narrowing conditions is reduced less than the number as previously set by the system, there is increase in the number of subject-of-recognition words/phrases upon finally speaking a name possibly resulting in lowered recognition rate. However, search can be continued thus providing great effects in respect of operationality and responsibility. Meanwhile, the increase of subject-of-recognition word/phrases might cause memory-capacity problems. This however can be avoided by dividing them into a plurality to implement the recognition process.

More preferably, the speech recognition method that reference speech information is extracted from a plurality of speech recognition dictionaries in a hierarchical structure to compare extracted reference speech information with an input speech thereby recognizing the speech, the speech recognition method being characterized in that: reference speech information representative of hierarchical-level skipping is prepared in a predetermined speech recognition dictionary so that, when recognizing an input of a speech corresponding to the reference speech information representative of hierarchical-level skipping, a part of the speech recognition dictionary belonging to a lower hierarchical level of reference speech information being compared is extracted to perform speech recognition.

Preferably, determination is made on the number of pieces of reference speech information in a speech recognition dictionary belonging to a lower hierarchical level of recognized reference speech information so that, when determined that the number exceeds a reference value, a part of the speech recognition dictionary belonging to the lower hierarchical level is extracted and compared to recognize similar reference speech information, and after completing comparison with the extracted reference speech information; an unextracted speech recognition dictionary being extracted from the speech recognition dictionaries belonging to the lower hierarchical level and compared to thereby recognize similar reference speech information; and reference speech information corresponding to an input speech being further selected from among a plurality of similar pieces of the reference speech information.

According to the invention, there is also provided a speech recognition method comprising: extracting one speech recognition dictionary from a plurality of speech recognition dictionaries having a plurality of pieces of reference speech information; comparing the reference speech information in an extracted speech recognition dictionary with an input speech; extracting another speech recognition dictionary different from the one speech recognition dictionary after completing a comparison with the reference speech information due to the speech recognition dictionary extracted; and the reference speech information in the extracted speech recognition dictionary being updated as reference speech information to be compared and comparison is made between updated reference speech information and the input speech to thereby recognize the speech inputted.

DETAILED DESCRIPTION OF THE PREFERRED EMBODIMENTS

Embodiments of the present invention will be explained in detail below with reference to the drawings showing thereof.

Figure 1:
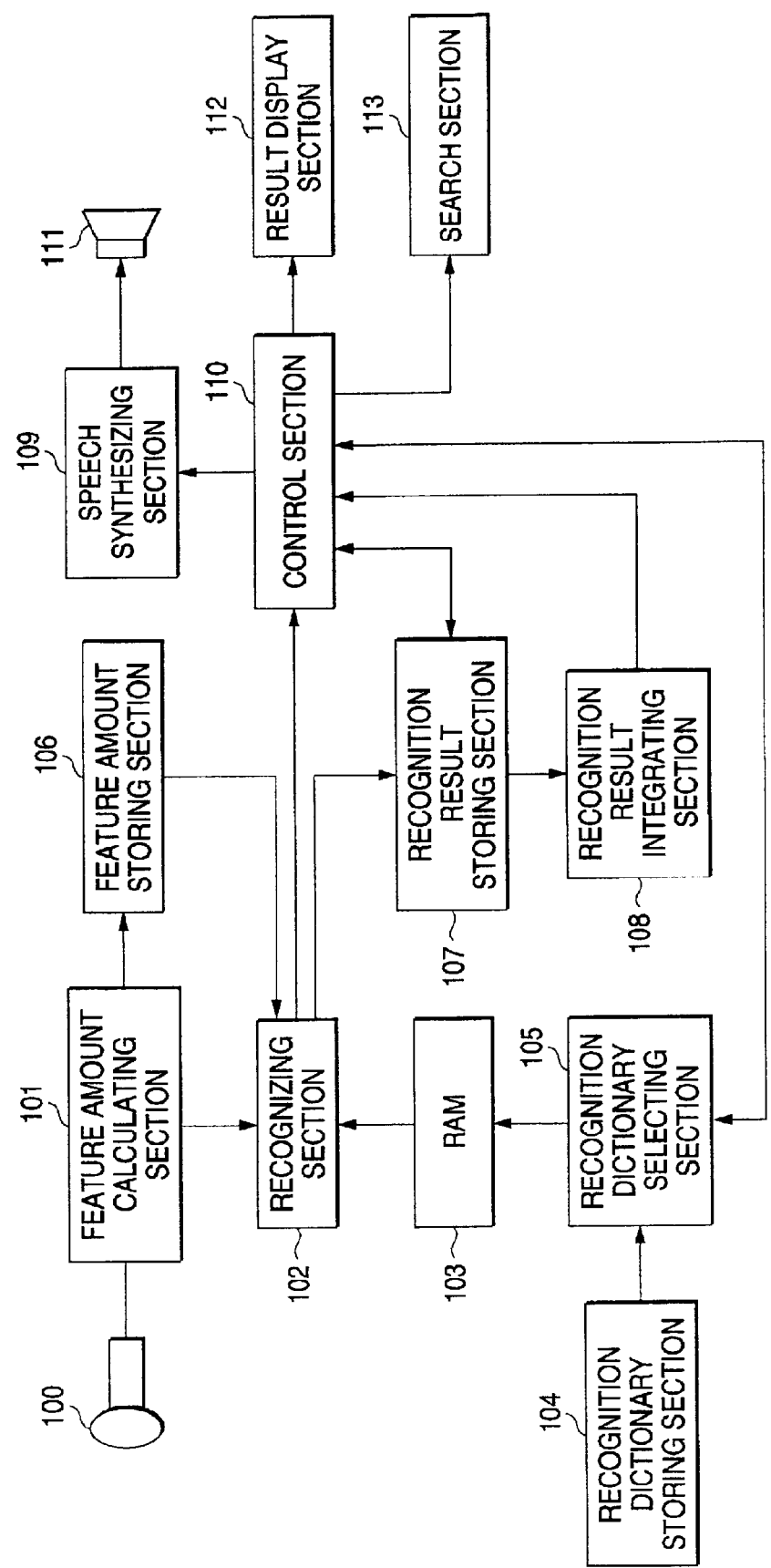
FIG. 1 is a block diagram showing a speech recognition apparatus according to an embodiment of the present invention.

In FIG. 1, there is shown a block diagram showing one embodiment of a speech recognition apparatus provided in a car navigation system. The speech recognition apparatus of the invention is configured with a mike 100, a feature amount calculating section 101, a recognizing section 102, a RAM 103, a recognition dictionary storing section 104, a recognition dictionary selecting section 105, a feature amount storing section 106, a recognition result storing section 107, a recognition result integrating section 108, a speech synthesizing section 109, a control section 110, a speaker 111, a result display section 112 and a search section 113.

The mike 100 inputs therein a speech spoken by a user and outputs it to a feature amount calculator 101.

The feature amount calculating section 101 converts the speech signal taken in by the mike 100 into PCM (Pulse Code Modulation) data and the PCM data into a feature amount suited for speech recognition thereby outputting it to the recognizing section 102 and feature amount storing section 106. The feature amount storing section 106 stores a calculated feature amount and supplies it to the recognizing section 102.

The recognition dictionary storing section 104 is stored with a plurality of speech recognition dictionaries having a plurality of pieces of reference speech information as subject-of-recognition words and phrases, with mutual association in a hierarchical fashion. The dictionaries in kind include narrowing condition dictionaries provided for each of a plurality of narrowing conditions and final location name dictionaries classified depending upon a combination of narrowing conditions. The location name dictionaries are those storing reference speech information representative of names of each concrete facility existing in each location, e.g. "a dictionary having reference speech information representative of all the university and college names of the universities and colleges belonging to the educational facilities existing in xx city, OO prefecture", "a dictionary having reference speech information representative of all the clinic names of the clinics belonging to the hospitals existing in xx city, OO prefecture" and so on. Meanwhile, the narrowing condition dictionaries include a metropolis-and-district name dictionary storing reference speech information representative of region names showing broad regions such as metropolis-and-district names for location search, a city/ward/town/village name dictionary provided for each metropolis or district and storing reference speech information representative of region names showing narrow regions such as city/ward/town/village names belonging to each metropolis or district, a genre name dictionary storing reference speech information representative of roughly-classified genre names such as the kinds of facilities existing in a designated location, sub-genre name dictionaries provided for respective roughly classified genres and storing reference speech information representative of sub-genre names belonging to each roughly classified genre and so on.

Incidentally, generally the total number of the location names in the lowermost level is extremely great, which is impractical as the number for recognition at one time in respect of the capacity of speech recognition dictionary RAM and recognition rate. Accordingly, in order to make the number of location names (size) of each location name dictionary less than a reference number determined by an available capacity of the RAM 103, the speech recognition dictionaries are in a hierarchical structure as in the foregoing, wherein location names are classified for each combination of a plurality of narrowing conditions to provide a location name dictionary for each classification.

The recognition dictionary selecting section 105 selects and extracts a speech recognition dictionary for a subject of recognition out of the recognition dictionary storing section 104 according to an instruction such as extraction of a speech recognition dictionary as a subject of recognition from the control section 110, and supplies it to the RAM 103. The RAM 103, each time a speech recognition dictionary is supplied, is updated by storage to a speech recognition dictionary supplied with reference speech information to be recognized.

The recognition section 102 calculates a similarity degree of between a feature amount that an input speech is converted or a feature amount that an input speech is converted stored in the feature amount storing section 106 is converted and the reference speech information in the speech recognition dictionary loaded to the RAM 103, and outputs reference speech information high in similarity degree and its similarity degree (score) as a recognition result to the recognition result storing section 107 and control section 110.

The recognition result storing section 107 stores a recognition result recognized by the recognizing section 102 (narrowing condition or location name) or a recognition result supplied from the control section 110, and outputs it to the recognition result integrating section 108 and control section 110. The recognition result integrating section 108, where a plurality of location names are stored as recognition results in the recognition result storing section 107, determines those of higher similarity degree of K in the number and supplies them as a new recognition result to the control section 110. Then, the control section 110 outputs the new recognition result supplied from the recognition result integrating section 108 to the recognition result storing section 107 in order for storage and updating as a second recognition result.

The speech synthesizing section 109 creates a guidance message or echo-back synthesized sound and supplies it to the speaker 111. The speaker 111 outputs the sound supplied from the sound synthesizing section 109.

The search section 111 has a database such as not-shown map data to search detailed facility information of a location map, address, telephone number, service content, etc. of a location finally designated by speech recognition from the database, according to an instruction from the control section 110. The result display section 112 is a display for displaying the detailed facility information searched by the search section 111 together with a recognition result upon performing speech operation, subject-of-recognition word or phrase, guidance message, echo back and so on.

The control section 110 controls each configuration according to an output result outputted from each configuration. Namely, the control section 110, when a location is designated by speech operation, first controls such that the recognition dictionary selecting section 105 takes a genre name dictionary from the recognition dictionary storing section 104 and sets it as reference speech information for a subject of recognition to the RAM 103. Furthermore, on the basis of a recognition result obtained from the recognizing section 102 and recognition result (narrowing condition) stored in the recognition result storing section 107, instruction is made to the recognition dictionary storing section 105 in order to extract a proper speech recognition dictionary while instruction is made to the sound synthesizing section 109 to prepare a guidance message.

Also, the new recognition result supplied from the recognition result integrating section 108 is outputted to the recognition result storing section 107 in order for storage and update as a current recognition result. Furthermore, receiving a final recognition result (location name), carried out are echo back of the recognition result by a synthesized sound, result display onto the result display section 112, search instruction to the search section 113 and so on. The detail of operation of the control section 110 will be described later using a flowchart.

Figure 2:
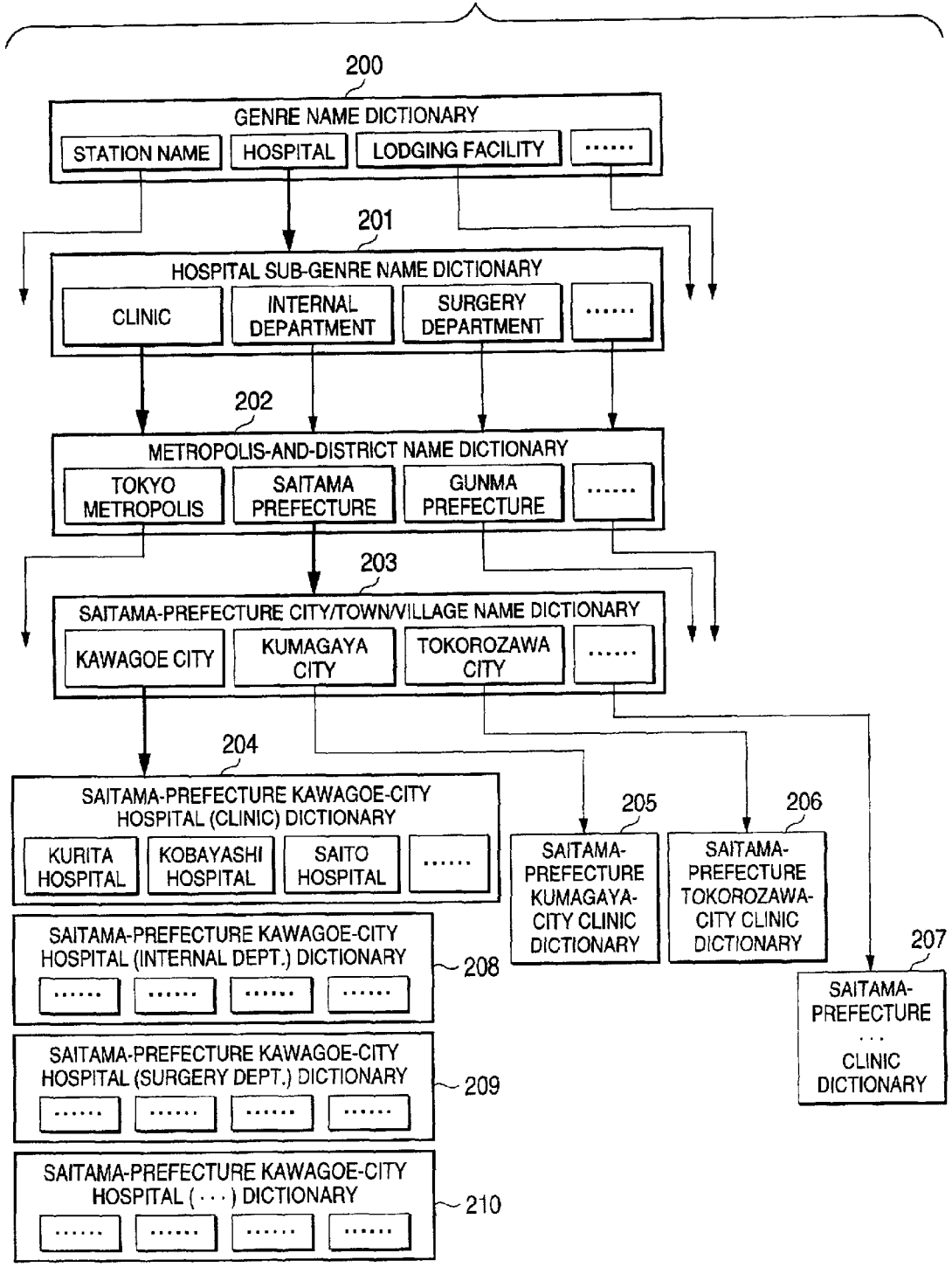
FIG. 2 is a figure showing one example of a hierarchical dictionary tree of a speech recognition dictionary having a hierarchical structure to be used in the invention.
Figure 3A:
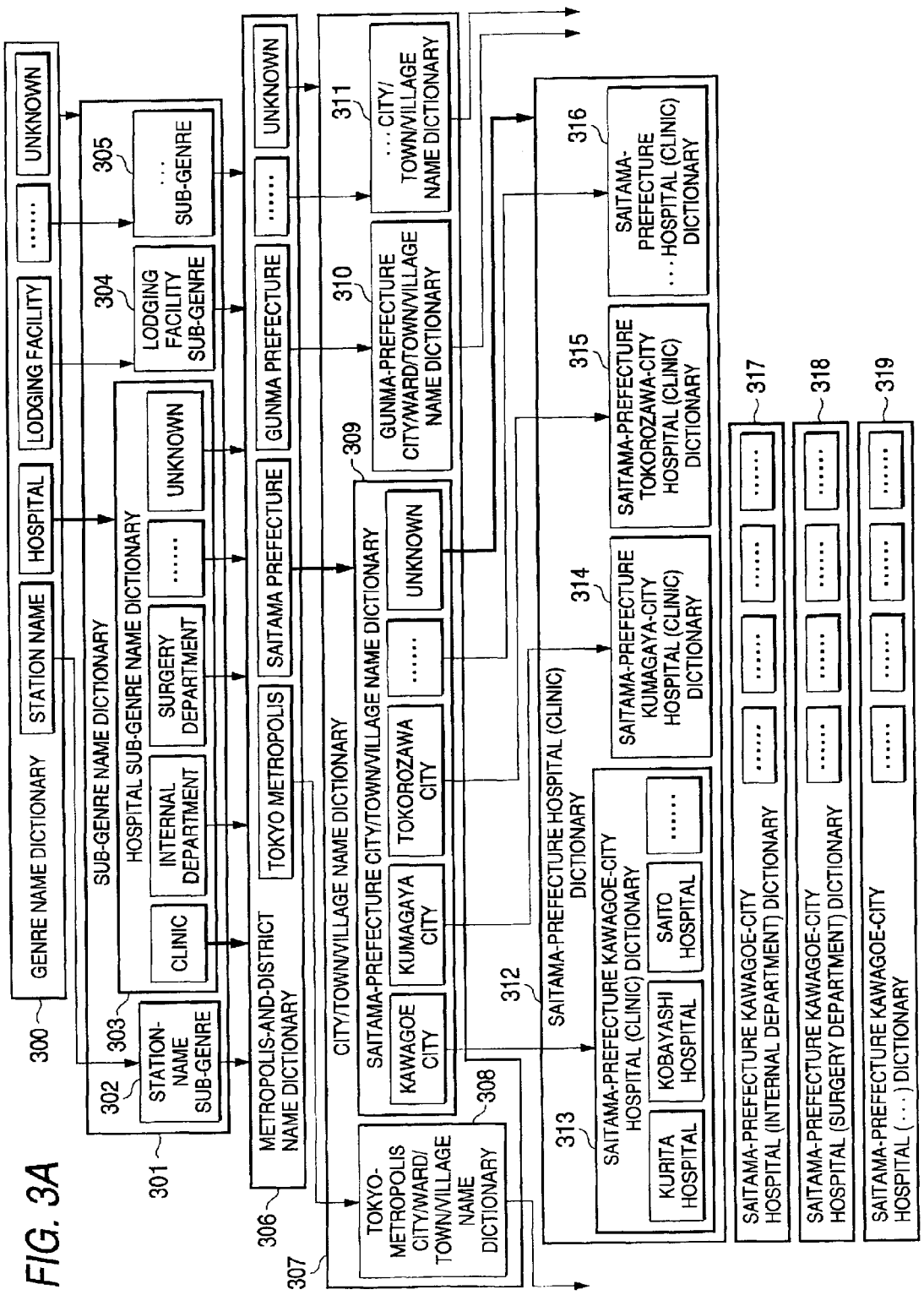
FIGS. 3A and 3B are figures showing one example of a hierarchical dictionary tree of a speech recognition dictionary having a hierarchical structure to be used in the invention.
Figure 3B:
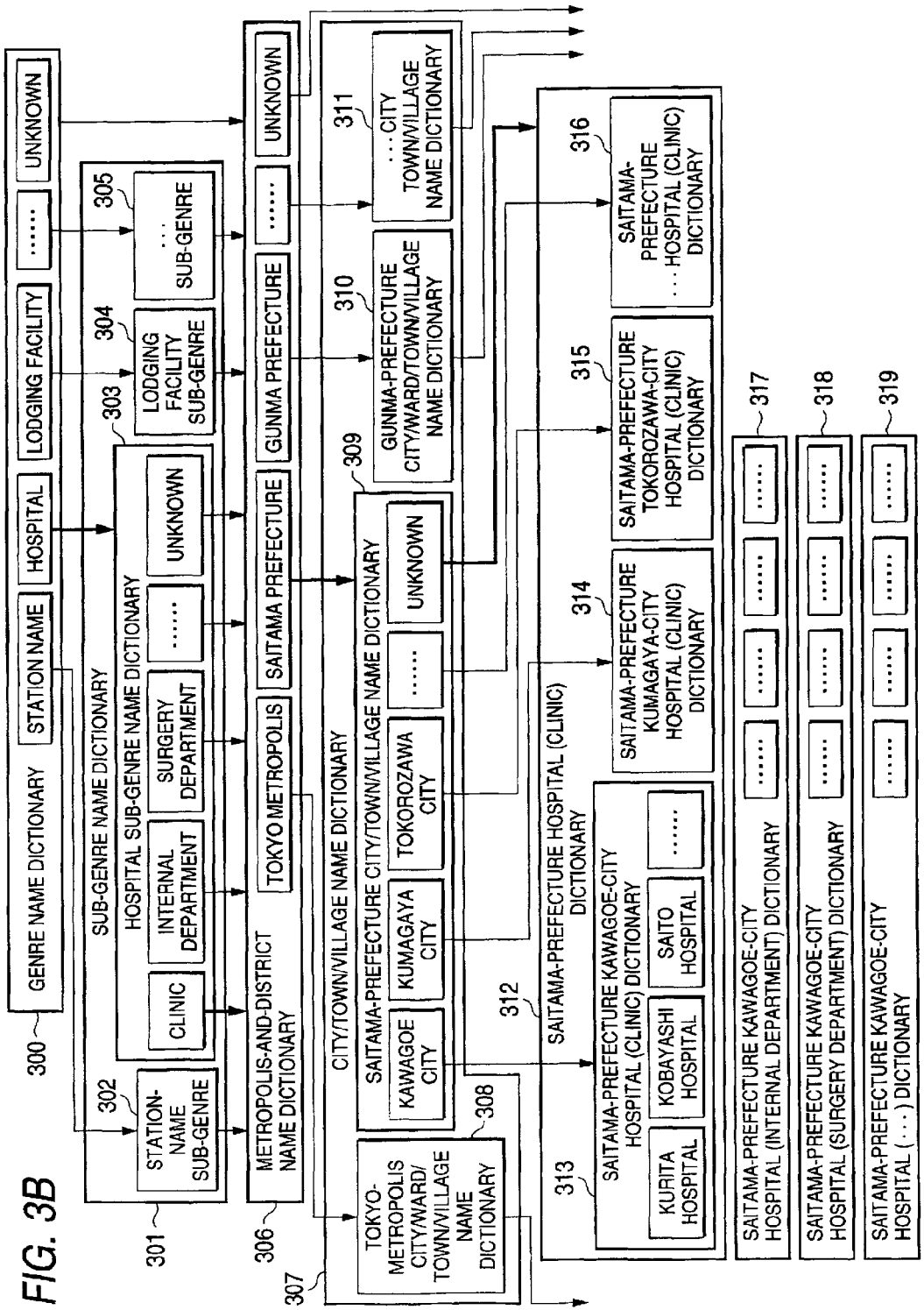
Figure 4:
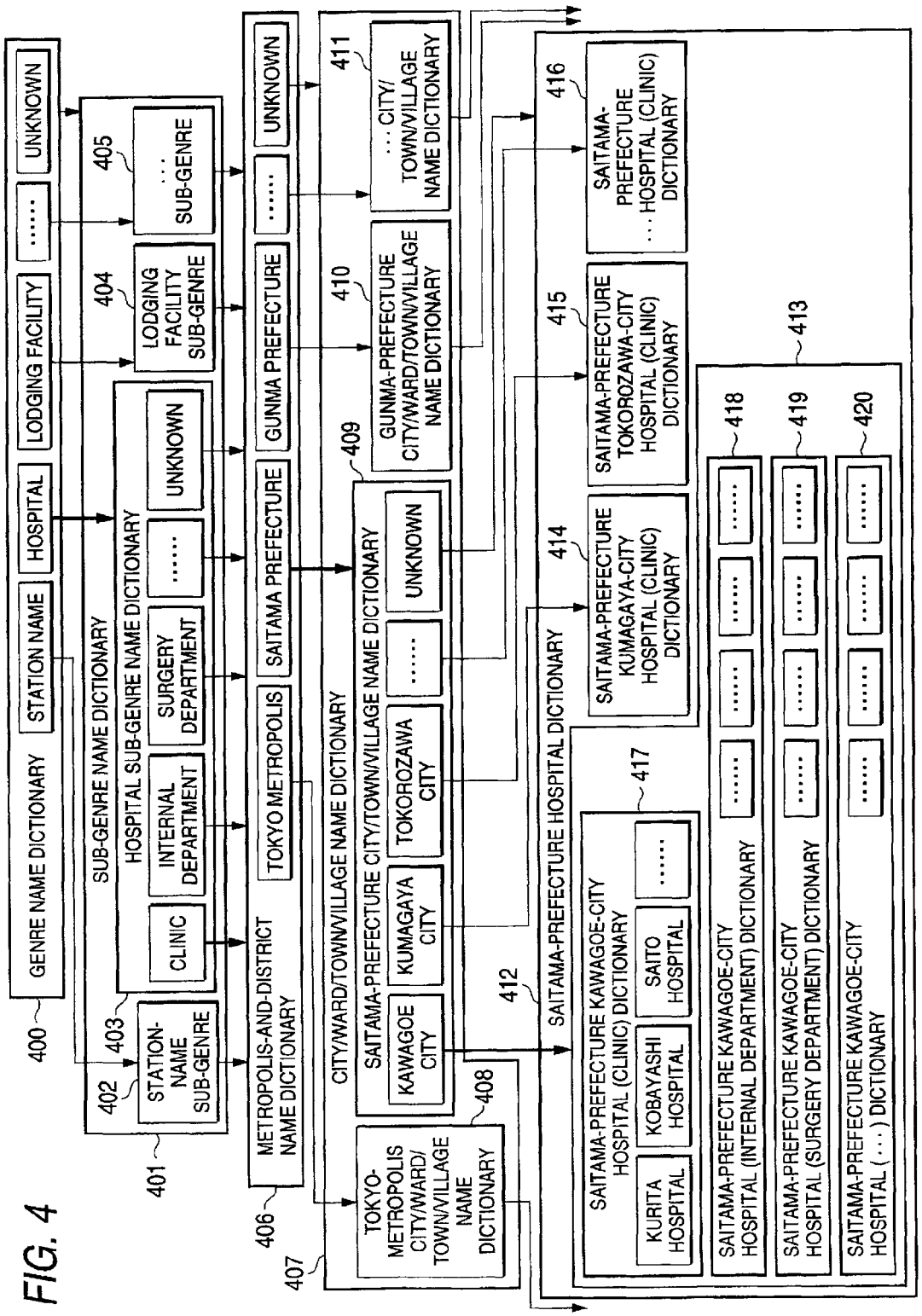
FIG. 4 is a figure showing one example of a hierarchical dictionary tree of a speech recognition dictionary having a hierarchical structure to be used in the invention.

Herein, explanation is made on the manner that a plurality of speech recognition dictionaries stored in the recognition dictionary storing section 104 form a hierarchical structure through association with one another, using FIGS. 2 to 4.

Incidentally, FIGS. 2 to 4 show only a part of a concrete example of a speech recognition dictionary. First, provided as a dictionary in an uppermost first hierarchical level is a genre name dictionary having reference speech information representative of "Unknown" as a hierarchical-level skipping word or phrase and genre names such as "station names", "hospitals" and "lodging facilities" (200 in FIG. 2, 300 in FIGS. 3A and 3B, 400 in FIG. 4)As a dictionary in a second hierarchical level following the first hierarchical level, provided is a sub-genre name dictionary having reference speech information representative of sub-genre names belonging to each of genre names such as station names, hospitals and lodging facilities (201 in FIG. 2, 302 to 305 in FIGS. 3A and 3B, 402 to 405 in FIG. 4). Also, as the reference speech information representative of sub-genre names there are pieces of reference speech information representative of sub-genre names corresponding to clinics, internal departments, surgery departments and the like and of reference speech information representative of "Unknown" as a hierarchical-level skipping word/phrase in a hospital sub-genre name dictionary, for example.

Furthermore, as a dictionary in a third hierarchical level following the second-leveled sub-genre name dictionary, there is provided a metropolis-and-district name dictionary having reference speech information representative of metropolis-and-district names in all over Japan and reference speech information representative of "Unknown" as a hierarchical-level skipping word/phrase (202 in FIG. 2, 306 in FIGS. 3A and 3B, 406 in FIG. 4).

Also, as a dictionary in a fourth hierarchical level following the third-leveled metropolis-and-district name dictionary, there are provided, for each metropolis-and-district name, city/ward/town/village name dictionaries having reference speech information representative of city/ward/town/village names existing in each metropolis or district and reference speech information representative of "Unknown" as a hierarchical-level skipping word/phrase (203 in FIG. 2, 308 to 311 in FIGS. 3A and 3B, 408 to 411 in FIG. 4).

Furthermore, as a dictionary in a lowermost fifth hierarchical-level dictionary, there are provided, for each combination of narrowing conditions of the first hierarchical level to fourth hierarchical level, location name dictionaries having reference speech information representative of location names (objective words) such as native names of the facilities existing in a location showing a concrete location (204 to 210 in FIG. 10, 312 to 319 in FIGS. 3A and 3B, 413 to 420 in FIG. 4).

Explanation is made below on an example of a search procedure of sequentially carrying out narrowing down of conditions to designate a location.

EXAMPLE 1

This example is an example of a search procedure in the case that the user is grasping every narrowing condition to be prompted from the system. Herein, explanation is made on an example of designating Kurita Hospital, a hospital (clinic) in Kawagoe city, Saitama prefecture, using FIG. 2.

First, narrowing down is made in a kind of the facilities existing in a subject of location (hereinafter referred to as genre).

A "genre name dictionary" is prepared and (1) a guidance message "Genre Name Please" is outputted to prompt the user to speak a genre name. In response to this, if the user (2) speaks as a genre name, for example, "Hospital", the speech recognition system recognizes the speech with the "Genre Name Dictionary" 200 as a subject of recognition.

In order for further narrowing down, the "Genre Name Dictionary" 200 as a subject of recognition is replaced by a "Hospital Sub-genre Name Dictionary" 201, and (3) a guidance message "Next Genre Name Please" is outputted to prompt the user to speak a sub-genre name. In response to this, if the user (4) speaks, for example, "Clinic" as a sub-genre name, the speech recognition system recognizes the speech with the "Hospital Sub-genre Name Dictionary" 201 as a subject of recognition.

If the sub-genre is established, then narrowing down is further made in region. The "Hospital Sub-genre Name Dictionary" 201 as a subject of recognition is replaced by a "Metropolis-and-district Name Dictionary" 202, and (5) a guidance message "Metropolis-or-district Name Please" is outputted to prompt the user to speak a metropolis-or-district name. In response to this, if the user (6) speaks, for example, "Saitama Prefecture" as a metropolis-or-district name, the speech recognition system recognizes the speech with the "Metropolis-and-District Name Dictionary" 202 as a subject of recognition.

If the metropolis or district is established, narrowing down is made in further detailed region. The "Metropolis-and-district Name Dictionary" 202 as a subject of recognition is replaced to a "Saitama-Prefecture City/Town/Village Name Dictionary" 203, and (7) a guidance message "City/Ward/Town/Village Name Please" is outputted to prompt the user to speak a city/ward/town/village name. In response to this, if the user (7) speaks, for example, "Kawagoe City" as a city/ward/town/village name, the speech recognition system recognizes the speech with the "Saitama-Prefecture City/Town/Village Name Dictionary" 203 as a subject of recognition.

Herein, the system side replaces the "Saitama-Prefecture City/Town/Village Name Dictionary" 203 as a subject of recognition to a "Clinic Location Name in Kawagoe-City, Saitama-Prefecture Dictionary" 204, and (9) a guidance message "Name Please" is outputted to prompt for speaking a concrete name of a designated location. In response to this, if the user (10) speaks "Kurita Hospital" as a location name, the speech recognition system recognizes the speech with the "Clinic Location Name in Kawagoe-City, Saitama-Prefecture Dictionary" 204 as a subject of recognition.

EXAMPLE 2

This example is an example of a search procedure in the case that the user is not grasping a city/ward/town/village name where a subject of location exists among the narrowing conditions to be prompted from the system. Herein, shown is an example of designating Kobayashi Hospital, a hospital (clinic) in Saitama Prefecture. Incidentally, the search procedure in this example is shown at bold-lined arrow in FIG. 3A.

First, narrowing down is made in a kind of the facilities existing in a subject of location (hereinafter referred to as genre). A "Genre Name Dictionary" 300 is prepared, and (1) a guidance message "Genre Name Please" is outputted to prompt the user to speak a genre name. In response to this, if the user (2) speaks, for example, "Hospital" as a genre name, the speech recognition system recognizes the speech with a "Genre Name Dictionary" 300 as a subject of recognition.

In order for further narrowing down, the "Genre Name Dictionary" 300 as a subject of recognition is replaced to the "Hospital Sub-Genre Name Dictionary" 303, and (3) a guide message "Next Genre Name Please" is outputted to prompt the user to speak a sub-genre name. In response to this, if the user (4) speaks, for example, "Clinic" as a sub-genre name, the speech recognition system recognizes the speech with a "Hospital Sub-genre Name Dictionary" 303 as a subject of recognition.

If the sub-genre is established, then narrowing down is further made in region. The "Hospital Sub-genre Name Dictionary" 303 as a subject of recognition is replaced to a "Metropolis-and-District Name Dictionary" 306, and (5) a guidance message "Metropolis-or-District Name Please" is outputted to prompt the user to speak a metropolis-or-district name. In response to this, if the user (6) speaks, for example, "Saitama Prefecture" as a metropolis-or-district name, the speech recognition system recognizes the speech with the "Metropolis-and-District Name Dictionary" 306 as a subject of recognition.

If the metropolis or district is established, narrowing down is made in further detailed region. The "Metropolis-and-District Name Dictionary" 306 as a subject of recognition is replaced to a "Saitama-Prefecture City/Town/Village Dictionary" 309, and (7) a guidance message "City/Ward/Town/Village Name Please" is outputted to prompt the user to speak a city/ward/town/village name. In response to this, if the user is not grasping a city/ward/town/village name and (8) speaks a hierarchical-level skipping word/phrase "Unknown", the speech is recognized with the "Saitama-Prefecture City/Town/Village Dictionary" 309 as a subject of recognition.

In the case that a hierarchical-level skipping word/phrase is spoken in the fourth hierarchical level, the system side skips an input of dictionary narrowing condition in the fourth-leveled dictionary without prompting an input of a city/town/village in the "Saitama-Prefecture City/Town/Village name Dictionary" 309 of the fourth hierarchical level, thereby considering as having inputted, as narrowing conditions, all the city/town/village names in the "Saitama-Prefecture City/Town/Village Dictionary" 309 in the fourth hierarchical level. "Hospital Clinics in All Saitama-Prefecture Cities/Towns/Villages Dictionary" 313 to 316 are extracted and gathered as a fifth-leveled dictionary to create a "Saitama-Prefecture Hospital Clinics Dictionary" 312, and the "Saitama-Prefecture City/Town/Village Dictionary" 309 is replaced to the "Saitama-Prefecture Hospital Clinics Dictionary" 312. Furthermore, (9) a guidance message "Name Please" is outputted to prompt for speaking a concrete name of a designated location. In response to this, if the user (10) speaks "Kobayashi Hospital" as a location name, the speech recognition system recognizes the speech with the "Saitama-Prefecture Hospital Clinics Dictionary" 312 as a subject of recognition.

Incidentally, FIG. 3A in the above is an example that, if a skipping word/phrase is spoken upon inputting a narrowing condition in a certain hierarchical level, a narrowing condition input in that hierarchical level is skipped over and the immediately lower hierarchical level is proceeded to prompt to input a narrowing condition. However, when a genre name is unknown, there is a high possibility that a sub-genre name also unknown, and further, when a metropolis-or-district name is unknown, there is a high possibility that a city/ward/town/village is also unknown. Accordingly, as shown in FIG. 3B where a skipping word/phrase is spoken in a predetermined hierarchical level, it can be considered that a skip destination is set such that proceeding is to a two-lower hierarchical level depending upon a hierarchical level of the hierarchical-level skipping word/phrase instead of advancement to the immediately lower hierarchical level.

EXAMPLE 3

This example is an example of a search procedure in the case that the user is not grasping a sub-genre of the facilities existing in a subject of location among the narrowing conditions to be prompted from the system. Herein, shown is an example of designating Saito Hospital in Kawagoe city, Saitama Prefecture. Incidentally, the search procedure in this example is shown at bold-lined arrow in FIG. 4.

At first, narrowing down is made in a kind of the facilities existing in a subject of location (hereinafter referred to as genre). A "Genre Name Dictionary" 400 is prepared, and (1) a guidance message "Genre Name Please" is outputted to prompt the user to speak a genre name. In response to this, if the user (2) speaks, for example, "Hospital" as a genre name, the speech recognition system recognizes the speech with a "Genre Name Dictionary" 400 as a subject of recognition.

In order for further narrowing down, the "Genre Name Dictionary" 400 as a subject of recognition is replaced to a "Hospital Sub-Genre Name Dictionary" 403, and (3) a guide message "Next Genre Name Please" is outputted to prompt the user to speak a sub-genre name. In response to this, if the user is not grasping a sub-genre name and (4) speaks a hierarchical-level skipping word/phrase "Unknown", the speech recognition system recognizes the speech with the "Hospital Sub-genre Name Dictionary" 403 as a subject of recognition.

In the case that a hierarchical-level skipping word/phrase is spoken in the second hierarchical level, the system side skips an input of a dictionary narrowing condition in the second hierarchical level without prompting an input of a sub-genre name in the "Hospital Sub-genre Name Dictionary" 403 of the second hierarchical level. Considering as having inputted as a narrowing condition all the sub-genre names in the "Hospital Sub-genre Name Dictionary" 403 in the second hierarchical level, the "Hospital Sub-genre Name Dictionary" 403 is replaced as a dictionary of a subject of recognition in the third hierarchical level to a "Metropolis-and-District Name Dictionary" 406, and (5) a guidance message "Metropolis-or-District Name Please" is outputted to prompt the user to speak a metropolis or district Name. In response to this, if the user (6) speaks, for example, "Saitama Prefecture" as a metropolis or district name, the speech recognition system recognizes the speech with the "Metropolis-and-District Name Dictionary" 406 as a subject of recognition.

If the metropolis or district name is established, then narrowing down is made in further detailed region. The "Metropolis-and-District Name Dictionary" 406 as a subject of recognition is replaced to a "Saitama-Prefecture City/Town/Village Name Dictionary" 409, and (7) a guidance message "City/Ward/Town/Village Name Please" is outputted to prompt the user to speak a city/ward/town/village name. In response to this, if the user (8) speaks, for example, "Kawagoe City" as a city/ward/town/village name, the speech recognition system recognizes the speech with the "Saitama-Prefecture City/Town/Village Name Dictionary" 409 as a subject of recognition.

Herein, the system side extracts and gathers "All the Saitama-Prefecture, Kawagoe-City Hospitals Dictionaries" 417 to 420 to prepare a "Saitama-Prefecture, Kawagoe-City Hospitals Dictionary" 413, and replace the "Saitama-Prefecture City/Town/Village Name Dictionary" 409 to the "Saitama-Prefecture, Kawagoe-City Hospitals Dictionary" 413. Furthermore, (9) a guidance message "Name Please" is outputted to prompt for speaking a concrete name of a designated location. In response to this, if the user (10) speaks "Saito Hospital" as a location name, the speech recognition system recognizes the speech with the "Saitama-Prefecture, Kawagoe-City Hospitals Dictionary" 413 as a subject of recognition.

Figure 5:
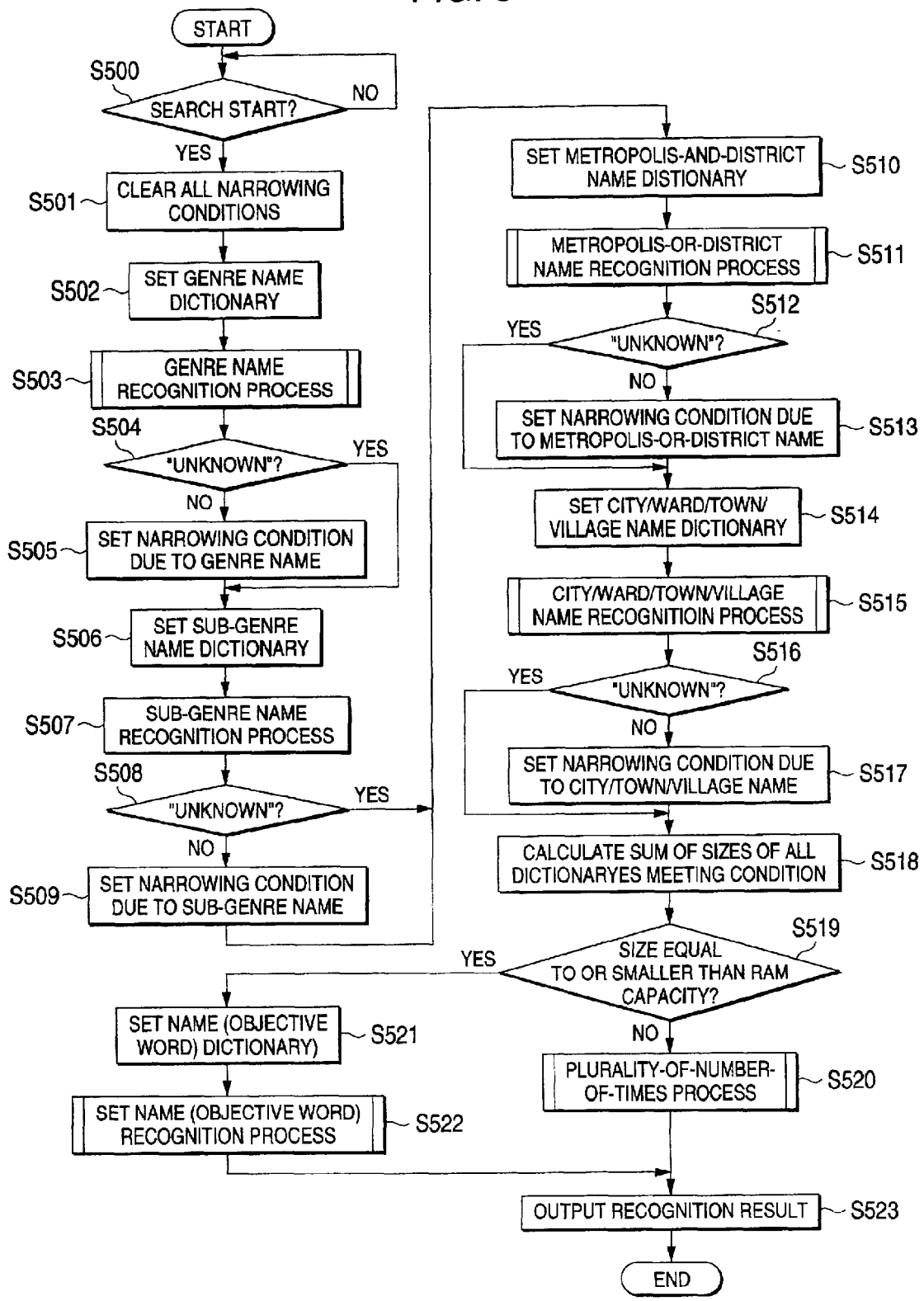
FIG. 5 is a flowchart cited for explaining the operation of location search due to speech recognition process of the embodiment of the invention.
Figure 6:
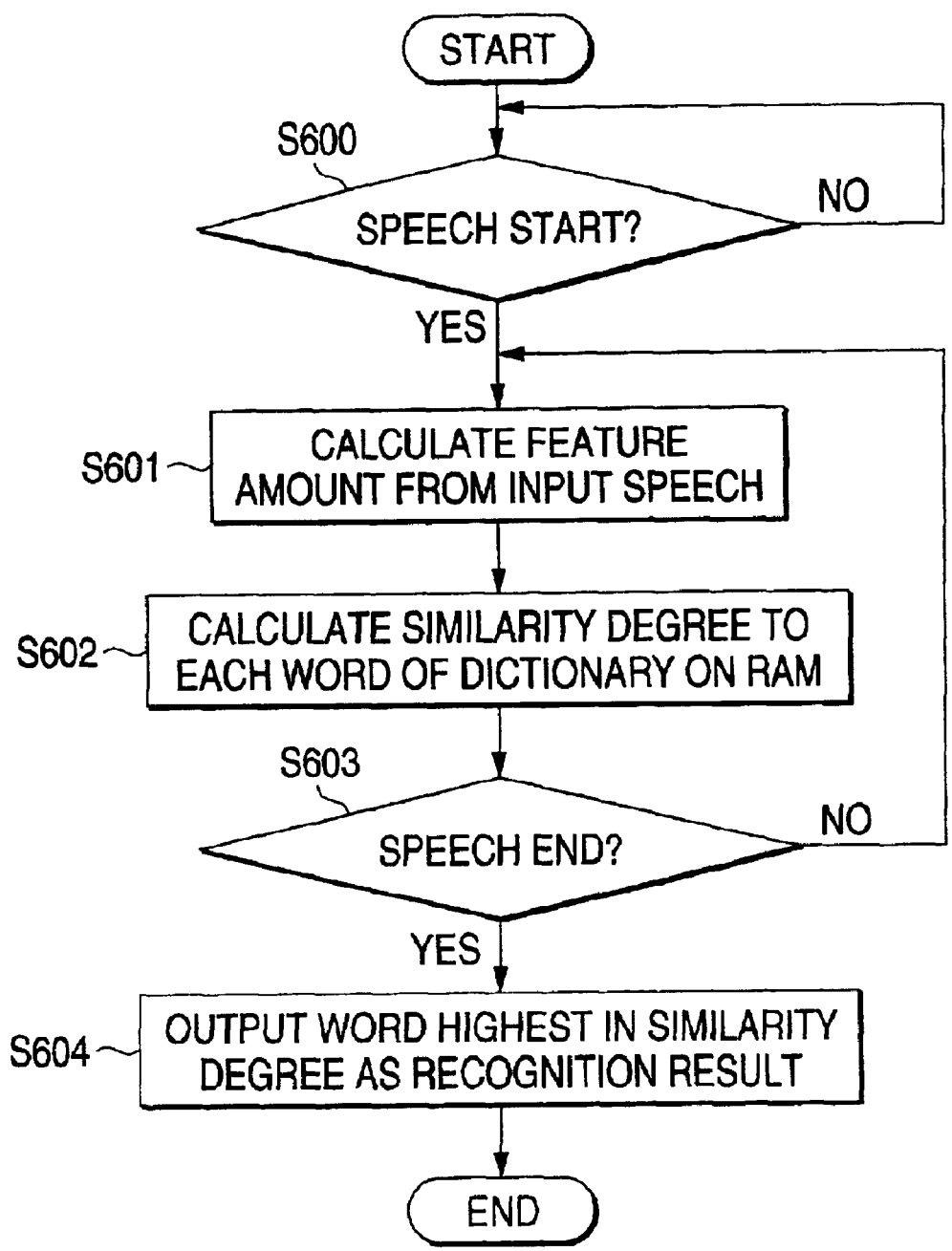
FIG. 6 is a flowchart cited for explaining a speech recognition processing operation in the embodiment of the invention.
Figure 7:
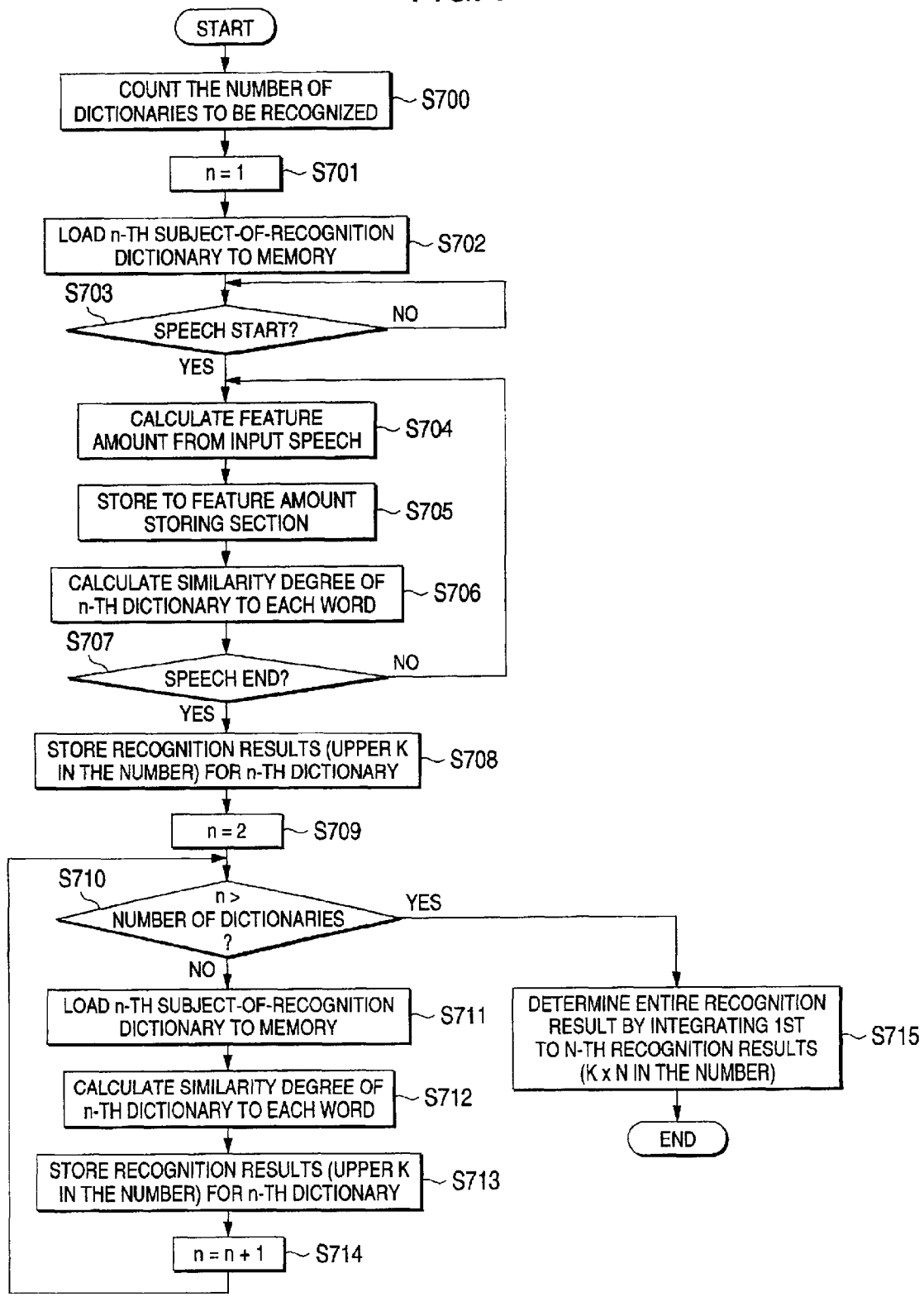
FIG. 7 is a flowchart cited for explaining a plurality-of-number-of-times recognition processing operation in the embodiment of the invention.

FIG. 5 to FIG. 7 are flowcharts cited for explaining the operation of the embodiments of the invention.

With reference to the flowcharts shown in FIG. 5 to FIG. 7, the operations of the embodiments shown in FIG. 1 to FIGS. 3A and 3B will be explained in detail below.

In FIG. 5, first the control section 110 detects a search start request for a location search made due to a speech input through not-shown speech button or the like by the user (step S500). If not detected (step S500 NO), it is in standby. If there is detection (step S500 YES), all cleared are the last-time narrowing conditions in stored in the recognition result storing section 107, i.e. genre name, sub-genre name, metropolis or district name, city/ward/town/village name and designated-location native name (step S501). The recognition dictionary selecting section 105 is caused to extract a genre name dictionary from among the speech recognition dictionaries stored in the recognition dictionary storing section 104 and load reference speech information representative of each genre name to the RAM 103 in order to make each genre name in the genre name dictionary a subject-of-recognition word/phrase (step S502).

The control section 110 causes the recognizing section 102 to carry out a recognition process on the input speech spoken by the user (genre name or "Unknown") with, as a subject, the speech recognition dictionary loaded to the RAM 103, and outputs a recognition result to the control section 110 (step S503). In the case that the recognition result obtained in step S503 is a hierarchical-level skipping word/phrase such as "Unknown" (step S504 YES), a narrowing-condition setting process due to genre name of step S505 is skipped over for advancement to a process of step S506. On the other hand, where the recognition result obtained in step S503 is any genre name (step S504 NO), the recognized genre name is stored as a narrowing condition to the recognition result storing section 107 (step S505).

Subsequently, the control section 110 causes the recognition dictionary selecting section 105 to extract a sub-genre name dictionary belonging to a lower hierarchical level next to a genre name dictionary currently stored as a subject-of-recognition word/phrase in the RAM 103 from among the speech recognition dictionaries stored in the recognition dictionary storing section 104, and loads the reference speech information representative of each sub-genre name to the RAM 103 in order to make a sub-genre name in the extracted sub-genre name dictionary a subject-of-recognition word/phrase (step S506). Incidentally, concerning the sub-genre name loaded herein, where the recognition result of step S503 is a hierarchical-level skipping word/ phrase such as "Unknown", because selected are all the sub-genre name dictionaries corresponding to the lower hierarchical level belonging to the reference speech information in the genre name dictionary having being set as a subject-of-recognition word/phrase in RAM 103 in step S502, all the sub-genre names are loaded as subjects of recognition to the RAM 103. On the other hand, if the recognition result of step S103 is any genre name, selected is a speech recognition dictionary of a sub-genre name belonging to the recognized genre name to load, as a subject of recognition, the sub-genre name in the selected sub-genre name dictionary to the RAM 103.

The recognizing section 102 is caused to carry out a recognition process on the input speech spoken by the user (sub-genre name or "Unknown") with, as a subject of recognition, the speech recognition dictionary loaded in the RAM 103 and output a recognition result to the control section 110 (step S507).

Where the recognition result obtained in step S507 is a hierarchical-level skipping word/phrase such as "Unknown" (step S508 YES), a narrowing-condition setting process due to the sub-genre name of step S509 is skipped over for advancement to step S510. On the other hand, where the recognition result obtained in step S507 is any sub-genre name (step S508 NO), the recognized sub-genre name is set as a narrowing condition to the recognition result storing section 107 (step S509).

The recognition dictionary selecting section 105 is caused to extract a metropolis-and-district name dictionary from among the speech recognition dictionaries stored in the recognition dictionary storing section 104 and load the reference speech information representative of each metropolis-or-district name with, as a subject of recognition, a metropolis-or-district name in the extracted metropolis-and-district name dictionary (step S510). Incidentally, concerning the metropolis-or-district name loaded herein, where the recognition result of step S507 is a hierarchical-level skipping word/phrase such as "Unknown" or where it is any sub-genre name, a metropolis-and-district name dictionary is selected to load, as a subject of recognition, a metropolis-or-district name in the selected metropolis-and-district name dictionary to the RAM 103.

The recognizing section 102 is caused to carry out a recognition process on the input speech spoken by the user (metropolis-or-district name or "Unknown") with, as a subject of recognition, the speech recognition dictionary loaded in the RAM 103 and output a recognition result to the control section 110 (step S511). Where the recognition result obtained in step S511 is a hierarchical-level skipping word/phrase such as "Unknown" (step S512 YES), a narrowing-condition setting process due to a metropolis or district name of step S513 is skipped over for advancement to step S514. On the other hand, where the recognition result obtained in step S511 is any metropolis or district name (step S512 NO), the recognized metropolis or district is set as a narrowing condition to the recognition result storing section 107 (step S513).

The recognition dictionary selecting section 105 is caused to extract a city/ward/town/village dictionary from among the speech recognition dictionaries stored in the recognition dictionary storing section 104 and load the reference speech information representative of each city/ward/town/village name to the RAM 103 in order to make the city/ward/town/village name a subject of recognition word or phrase (step S514).

Incidentally, concerning the city/ward/town/village name to be loaded herein, where the recognition result in step S511 is a hierarchical-level skipping word/phrase such as "Unknown", selected are all the city/ward/town/village name dictionaries in all over the country corresponding to the lower hierarchical level belonging to the reference speech information in all the metropolis-and-district name dictionaries of all over the country having been set in step S510, to load all the city/ward/town/village names as subjects of recognition to the RAM 103. On the other hand, where the recognition result of step S511 is any metropolis or district name, extracted is a speech recognition dictionary for the city/ward/town/village existing in the recognized metropolis or district to load, as subjects of recognition word or phrase, city/ward/town/village names in the extracted city/ward/town/village name dictionary to the RAM 103.

The recognizing section 102 is caused to carry out a recognition process on the input speech spoken by the user (city/ward/town/village name or "Unknown") with, as a subject of recognition, the speech recognition dictionary loaded in the RAM 103 and output a recognition result to the control section 110 (step S515).

Where the recognition result obtained in step S515 is a hierarchical-level skipping word/phrase such as "Unknown" (step S516 YES), a narrowing-condition setting process due to the city/ward/town/village name of step S517 is skipped over for advancement to step S518. On the other hand, where the recognition result obtained in step S515 is any city/ward/town/village name (step S516 NO), the recognized city/ward/town/village is set as a narrowing condition to the recognition result storing section 107 (step S517).

With the speech recognition dictionary stored in the recognition dictionary storing section 104, calculated is a sum of the number of pieces of reference speech information (size) in location name dictionaries satisfying the narrowing conditions stored in the recognition result storing section 107 in the processes of steps S505, S513 and S517 (step S518). Where the sum of the sizes of the location name dictionaries exceeds a reference number set according to the capacity of the RAM 103 (step S519 NO), recognition process is carried out a plurality-of-number of times for all the location name dictionaries as subjects of recognition (step S520). Where the sum of the sizes of the location name dictionaries is less than the capacity of the RAM 103 (step S519 YES), the reference speech information representative of each location name is loaded to the RAM 103 in order to make as subject-of-recognition words/phrases the location names in all the location name dictionaries satisfying the stored narrowing condition (step S521), to carry out a normal recognition process (step S522). Then, outputted is a location name as a recognition result obtained in step S520 or step S522 (step S523).

Incidentally, in the above flowchart, where as a narrowing condition a genre name input is skipped over, i.e. where the recognition result obtained in step S503 is a hierarchical-level skipping word/phrase such as "Unknown" (step S504 YES), the narrowing-condition setting process due to the genre name of step S505 only is skipped over for advancement to the process of step S506. However, without limited to the foregoing example, where a genre name is unknown, there is a high possibility that a sun-genre name is also unknown. Accordingly, the input of a sub-genre name also may be skipped over for advancement to the process of step S510.

Explanation is made, using a flowchart of FIG. 6, on a detailed procedure of each recognition process of the recognizing section 102 for a speech inputted in the step S503, S507, S511, S515, S522 shown in FIG. 5 by the user.

In FIG. 6, determination is made as to whether speech input at the mike 100 is started or not (step S600). As a speech-input detecting method, it is possible to consider a method, for example, that a threshold concerning a sound pressure level and a reference time are previously stored in the feature amount calculating section 101 to compare an input-signal sound pressure level through the mike 100 with the threshold so that, where the state the input signal exceeds the predetermined threshold continues for the reference time or longer, sound input is considered started.

If detecting a speech start, an input speech is converted to a feature amount suited for speech recognition in the feature amount calculating section 101 (step S601), being stored to the feature amount storing section 106 and supplied from the feature amount calculating section 101 to the recognizing section 102. The recognizing section 102 calculates a similarity degree of between the supplied feature amount and each piece of the reference speech information loaded in the RAM 103 (step S602). Then, determination is made whether the sound input has been ended or not (step S603). Incidentally, as a speech-end detecting method, it is possible to consider a method, for example, that a threshold concerning a sound pressure level and a reference time are previously stored in the feature amount calculating section 101 to compare an input-signal sound pressure level through the mike 100 with the threshold so that, where the state the input signal exceeds the predetermined threshold continues for the reference time or longer, sound input is considered ended.

Where determining the speech is not ended (step S603 NO), the process of step S601 is returned. On the other hand, if the speech is determined ended (step S603 YES), the reference speech information higher in similarity degree determined in step S602 is put in correspondence to its similarity degree to have a recognition result that is outputted to the control section 110 and recognition result storing section 107 and stored to the recognition result storing section 107 (step S604).

Explanation is made on a plurality-of-number-of-times of recognition process to be executed in step S520 in the case the sum of the sizes of location name dictionaries determined in step S518 cannot be accommodated in the capacity of the RAM 103 (step S519 NO) as was described in the flowchart of FIG. 5, using a flowchart of FIG. 7. The plurality-of-number-of-times of recognition process is to repeat the recognition process while switching over the dictionaries (N in the number) as subjects of recognition for once input speech, integrate recognition results of the respective dictionaries and finally determine an recognition result as the overall.

In FIG. 7, counted is the number of location name dictionaries (N) satisfying the narrowing condition stored in the recognition result storing section 107 in the processes of steps S505, S509, S513, S517, with the dictionary stored in the recognition dictionary storing section 104 (step S700). Subsequently, dictionary number is given n=1 (step S701). Herein, a location name dictionary lowest in the management number among the location name dictionaries satisfying the narrowing condition is rendered a location name dictionary of dictionary number 1, the recognition dictionary selecting section 105 is caused to extract a location name dictionary of dictionary number n (=1) from the recognition dictionary storing section 104, and the reference speech information representative of each location name is loaded to the RAM 103 in order to make a location name of the extracted location name dictionary a subject-of-recognition word/phrase (step S702). Herein, management number signifies a number assigned, in order, to each speech recognition dictionary stored in the recognition dictionary storing section 104.

Next, determination is made whether speech input from the mike 100 was started or not (step S703). As a speech-input detecting method, it is possible to consider a method, for example, that a threshold concerning a sound pressure level and a reference time are previously stored in the feature amount calculating section 101 to compare an input-signal sound pressure level from the mike 100 with the threshold so that, where the state the input signal exceeds the predetermined threshold continues for the reference time or longer, sound input is considered started.

If detecting a speech start, an input speech is converted into a feature amount suited for speech recognition in the feature amount calculating section 101 (step S704) and stored to the feature amount storing section 106 (step S705), and supplied from the feature amount storing section 106 to the recognizing section 102. In the recognizing section 102, calculated is a similarity degree of between the supplied feature amount and all the pieces of reference speech information loaded in the RAM 103 (step S706). Then, determination is made whether the sound input has been ended or not (step S707).

Incidentally, as a speech-end detecting method, it is possible to consider a method, for example, that a threshold concerning a sound pressure level and a reference time are previously stored in the feature amount calculating section 101 to compare an input-signal sound pressure level from the mike 100 with the threshold so that, where the state the input signal is equal to or less than the predetermined threshold continues for the reference time, sound input is considered ended.

In the case of the determination that the speech is not ended (step S707 NO), the process of step S704 is returned. On the other hand, where determined that the speech is ended (step S707 YES), the reference speech information of K in the number of pieces in the order of higher similarity degree determined in step S706 is put correspondence with its similarity degree, and outputted as a recognition result of location name dictionary of dictionary number n=1 to the recognition result storing section 107 and stored to the recognition result storing section 107 (step S708). Incidentally, K is an integer equal to or greater than 1 which is a value to be appropriately set by a system designer.

Subsequently, dictionary number is given n=2 (step S709). Determination is made whether the dictionary number n is greater than the number of subject-of-recognition dictionaries (N) counted in step S700 or not (step S710). If the dictionary number n is equal to or less than the number of subject-of-recognition dictionaries (N) (step S710 NO), advancement is to the process of step S711. A location name dictionary n-th lower in the management number among the location name dictionaries satisfying the narrowing condition is rendered a location name dictionary of dictionary number=n, the recognition dictionary selecting section 105 is caused to extract a location name dictionary of dictionary number (n) from the recognition dictionary storing section 104, and the reference speech information representative of each location name is loaded to the RAM 103 in order to make a location name of the extracted location name dictionary a subject-of-recognition word/phrase (step S711).

Because the feature amount of the input speech is already stored in the feature amount storing section 106, it is supplied therefrom to the recognizing section 102 so that, in the recognizing section 102, calculated is a similarity degree of between the supplied feature amount and all the pieces of reference speech information loaded in the RAM 103 (step S712). The reference speech information of K in the number of pieces in the order of higher similarity degree determined in step S712 is put correspondence with its similarity degree, and outputted as a recognition result of location name dictionary of dictionary number n to the recognition result storing section 107 and stored to the recognition result storing section 107 (step S713). Then, the dictionary number n is incremented to=N+1 (step S714). From now on, the process of step S711 to step S714 is repeated until it is determined in step S710 that the dictionary number n exceeds the number of subject-of-recognition dictionaries (N).

On the other hand, if the dictionary number n is greater than the number of subject-of-recognition dictionaries (N) (step S710 YES), advancement is to the process of step S715. In step S715, selected as a second recognition result is K in the number in the order of higher similarity degree from among the recognition results of K×N in the number stored to the recognition result storing section 107 by the recognition result integrating section 108, and outputted to the control section 110, being updated and stored to the recognition result storing means 107. Incidentally, in the case K is 1, recognition result is specified one in step S715. However, in the case K is 2 or greater, because further one is selected from among the second recognition result in the number of K, the second recognition results in the number of K are outputted to the control section 110 to display location names in the number of K on the result display section 112, thereby allowing the selection with not-shown operation button. Otherwise, the one highest in similarity degree is presented as a recognition result to the user by the use of the speaker 111 and result display section 112. It is satisfactory that the one next higher in similarity degree is similarly presented according to a speech of NO or the like by the user wherein sequential presentation is made until operation or speech of YES or the like by the user so that one is determined from the recognition results.

Incidentally, concerning the hierarchical-level skipping word/phrase, the word "Unknown" is one example but may be wording expressing that the information the system is requesting is not possessed by the user, e.g. may be in a plurality, such as "Pass", "Next" or the like. Meanwhile, narrowing condition is not limited to "Genre Name", "Sub-genre Name", "Metropolis and District Name" and "City/Ward/Town/Village Name" but may be "Place Name", "Postcode" or the like.

As explained above, according to the present invention, where an input of a condition not known by the user is requested from the system upon narrowing down for a designated location, the reference speech information representative of hierarchical-level skipping (spoken "Unknown") is inputted thereby making it possible to continue search and improve operationality and responsibility.

Incidentally, in this case, because narrowing conditions are reduced lower than the number having been previously set by the system, there is a possibility that the number of subject-of-recognition word/phrase upon finally speaking a name is increased resulting in lower in recognition rate. However, search is made possible to continue thus providing great effects in terms of operationality and responsibility. Also, although memory capacity is made problematic by the increase of subject-of-recognition words/phrases, this can be avoided by implementing the recognition process with division into a plurality.

What is claimed is:

1. A speech recognition apparatus comprising:

a hierarchical dictionary section stored with a plurality of speech recognition dictionaries having a plurality of reference speech signals with mutual association in a hierarchical fashion;

extracting means for extracting a proper speech recognition dictionary from said hierarchical dictionary section;

list storing means for storing the extracted speech recognition dictionary;

speech input means for inputting a speech;

recognizing means for comparing an input speech with the reference speech information in the speech recognition dictionary stored in said list storing means to recognize the speech;

wherein said extracting means extracts a speech recognition dictionary belonging to a lower hierarchical level of the reference speech information corresponding to the speech recognized and said list storing means updates and stores the extracted speech recognition dictionary, said speech recognition apparatus;

wherein reference speech information representative of hierarchical-level skipping is prepared in a predetermined speech recognition dictionary so that, when said recognizing means recognizes a speech input corresponding to the reference speech information representative of hierarchical-level skipping, said extracting means extracts, and updates and stores to said list storing means, a speech recognition dictionary belonging to a lower hierarchical level of the reference speech information stored in said list storing means.

2. The speech recognition apparatus according to claim 1, further comprising as the speech recognition dictionary a kind-based dictionary storing kinds of facilities and a location dictionary storing facility names belonging to the kinds of the facilities.

3. The speech recognition apparatus according to claim 1, further comprising as the speech recognition dictionary a region dictionary storing region names and a location dictionary storing facility names of facilities existing in any of the regions.

4. The speech recognition apparatus according to claim 1, further comprising as the speech recognition dictionary a region dictionary storing region names, a kind-based dictionary storing kind names of the facilities and a location dictionary storing facility names of facilities existing in any of the regions and belonging to any of the kinds;

wherein, after the reference speech information representative of hierarchical-level skipping is recognized in said kind-based name selecting level, said extracting means extracts the region dictionary.

5. The speech recognition apparatus according to claim 1, further comprising:

number determining means for determining the number of pieces of reference speech information in the speech recognition dictionary belonging to a lower hierarchical level of the reference speech information recognized by said recognizing means;

input-speech storing means for storing a speech inputted, and similar-word storing means for recognizing similar reference speech information by sequentially comparing by said recognizing means between a speech stored in said input-speech storing means and reference speech information stored in said list storing means to store the similar reference speech information; and determining means provided in said number determining means to determine whether the number of words/phrases of the reference speech information in the speech recognition dictionary belonging to the lower hierarchical level of the reference speech information corresponding to a speech recognized exceeds a reference value or not;

wherein when determined as the predetermined number or greater, said extracting means extracting, and storing to said list storing means, a speech recognition dictionary as a part of the speech recognition dictionary belonging to the lower hierarchical level;

wherein after said recognizing means completes comparison with the reference speech information stored in said list storing means, said extracting means extracts an unextracted dictionary of among the speech recognition dictionaries belonging to the lower hierarchical level to be updated and stored by said list storing means;

wherein said recognizing means sequentially compares between reference speech information belonging to a dictionary updated and stored in said list storing means and the speech stored in said input-speech storing means to recognize similar reference speech information; and wherein said similar-word storing means additionally stores the similar reference speech information newly recognized.

6. The speech recognition apparatus according to claim 5, wherein said recognizing means recognizes, and renders as a recognition result, one of all similar words stored in said similar-word storing means.

7. The speech recognition apparatus according to claim 5, wherein a plurality of pieces of similar reference speech information of among the reference speech information stored in said list storing means are stored in said similar-word storing means, comprising selecting means for selecting further a recognition result from among all pieces of similar reference speech information stored in said similar-word storing means.

8. A speech recognition apparatus comprising:

a hierarchical dictionary section stored with a plurality of speech recognition dictionaries having a plurality of pieces of reference speech information;

extracting means for extracting one dictionary of among the plurality of speech recognition dictionaries;

list storing means for storing the dictionary extracted, speech input means for inputting a speech;

an input-speech storing means far storing an input speech;

recognizing means for sequentially comparing between a speech stored in said input-speech storing means and the reference speech information stored in said list storing means to recognize similar reference speech information; and similar-word storing means for storing the similar pieces of the reference speech information;

wherein after said recognizing means completes a comparison between all pieces of the reference speech information belonging to the dictionaries stored in said list storing means and a speech stored in said input-speech storing means, said extracting means extracts from the speech recognition dictionary an unextracted dictionary to be updated and stored by said list storing means;

wherein said recognizing means compares between reference speech information belonging to a dictionary updated and stored to said list storing means and the speech stored in said input-speech storing means to recognize similar reference speech information; and wherein said similar-word storing means additionally stores the similar reference speech information newly recognized.

9. The speech recognition apparatus according to claim 8, further comprising selecting means for selecting further a recognition result from among a plurality of pieces of reference speech information stored in said similar-word storing means.

10. A speech recognition method that reference speech information is extracted from a plurality of speech recognition dictionaries in a hierarchical structure to compare extracted reference speech information with an input speech thereby recognizing the speech, said method comprising the steps of:

preparing reference speech information representative of hierarchical-level skipping in a predetermined speech recognition dictionary so that, when recognizing an input of a speech corresponding to the reference speech information representative of hierarchical-level skipping; and extracting a part of the speech recognition dictionary belonging to a lower hierarchical level of reference speech information being compared to perform speech recognition.

11. The speech recognition method according to claim 10, wherein determination is made on the number of pieces of reference speech information in a speech recognition dictionary belonging to a lower hierarchical level of recognized reference speech information so that, when determined that the number exceeds a reference value, a part of the speech recognition dictionary belonging to the lower hierarchical level is extracted and compared to recognize similar reference speech information, and after completing comparison with the extracted reference speech information;

an unextracted speech recognition dictionary being extracted from the speech recognition dictionaries belonging to the lower hierarchical level and compared to thereby recognize similar reference speech information; and reference speech information corresponding to an input speech being further selected from among a plurality of similar pieces of the reference speech information.

12. A speech recognition method according to claim 10, further comprising the steps of:

extracting one speech recognition dictionary from the plurality of speech recognition dictionaries having a plurality of pieces of reference speech information;

comparing the reference speech information in an extracted speech recognition dictionary with the input speech;

extracting another speech recognition dictionary different from the one speech recognition dictionary after completing a comparison with the reference speech information due to the speech recognition dictionary extracted; and updating the reference speech information in the extracted speech recognition dictionary as reference speech information to be compared and comparison is made between updated reference speech information and the input speech to thereby recognize the speech inputted.

* * * * *